US007442219B2

(12) United States Patent
Jeong et al.

(10) Patent No.: US 7,442,219 B2
(45) Date of Patent: Oct. 28, 2008

(54) DUST COLLECTION UNIT FOR VACUUM CLEANER

(75) Inventors: Hoi Kil Jeong, Changwon-si (KR); Man Tae Hwang, Changwon-si (KR); Young Ho Kim, Changwon-si (KR); Jung Bae Hwang, Daegu (KR); Min Park, Busan (KR)

(73) Assignee: LG Electronics Inc., Seoul (KR)

(*) Notice: Subject to any disclaimer, the term of this patent is extended or adjusted under 35 U.S.C. 154(b) by 398 days.

(21) Appl. No.: 11/232,855

(22) Filed: Sep. 23, 2005

(65) Prior Publication Data

US 2006/0137303 A1 Jun. 29, 2006

(30) Foreign Application Priority Data

Dec. 27, 2004 (KR) ...................... 10-2004-0113373

(51) Int. Cl.
*B01D 59/50* (2006.01)
*B01D 45/00* (2006.01)

(52) U.S. Cl. .......................................... 55/337; 55/343

(58) Field of Classification Search .................. 55/343, 55/337

See application file for complete search history.

(56) References Cited

U.S. PATENT DOCUMENTS 6,461,508 B1 * 10/2002 Thomson ................. 210/512.1
2004/0088956 A1 * 5/2004 Gammack .................... 55/346
2006/0123590 A1 * 6/2006 Fester et al. .................. 15/353

FOREIGN PATENT DOCUMENTS

EP 1219223 A2 * 7/2002

OTHER PUBLICATIONS

U.S. Appl. No. 60/593,125, Fester et al. Dec. 13, 2004.*

* cited by examiner

*Primary Examiner*—Walter D. Griffin
*Assistant Examiner*—Amber Miller Harris
(74) *Attorney, Agent, or Firm*—McKenna Long & Aldridge LLP

(57) ABSTRACT

A dust collection unit for a vacuum cleaner includes a first cylindrical filtering chamber for filtering foreign objects contained in air using a cyclone airflow, a plurality of second filtering chamber formed along an outer circumference of the first cylindrical filtering chamber to receive the air passed through the first cylindrical filtering chamber, a first storing chamber formed under the first filtering chamber to store the foreign objects filtered in the first filtering chamber, a second storing chamber for storing the foreign objects filtered in the second filtering chambers, and a connection plate interconnecting opposite ends of the second storing chamber to define the first filtering chamber, the connection plate having a lower end located to be higher than a lower end of the second storing chamber.

19 Claims, 8 Drawing Sheets

DUST COLLECTION UNIT FOR VACUUM CLEANER

This application claims priority to Korean Patent Application No. 10-2004-0113373, filed Dec. 29, 2004, the contents of which is hereby incorporated by reference in its entirety.

BACKGROUND OF THE INVENTION

1. Field of the Invention

The present invention relates to a dust collection unit for a vacuum cleaner, and more particularly, to a dust collection unit for a vacuum cleaner, which has an improved internal structure to improve the dust collection efficiency and increases a foreign object storing space.

2. Description of the Related Art

A vacuum cleaner is used to clean a room or other spaces by sucking air containing foreign objects and filtering the foreign object using vacuum pressure generated therein. In order to filter the foreign objects contained in the sucked air, a dust collection unit is provided in the vacuum cleaner and a filter designed with a predetermined structure is provided in the dust collection unit.

The typical filter is formed of porous material so that the foreign objects are filtered while the air containing the foreign objects passes through the filter.

However, since it is inconvenient to reuse the filter formed of the porous material and it is difficult to clean the filter, in recent years, a cyclone unit has been widely used. However, the cyclone unit has a problem in that it cannot filter microscale foreign objects. Therefore, an additional porous filter formed of the porous material has been associated with the cyclone unit.

However, when the porous filter is combined with the cyclone unit, the problem of periodically cleaning the filter still remains. When the foreign objects are implanted in the porous filter, an airflow rate is reduced, thereby deteriorating the operational efficiency of the vacuum cleaner.

To solve the above problems, in recent years, a multi-cyclone type dust collection unit in which the cyclone unit is provided in plurality to generate a plurality of cyclone air flows so that the foreign objects contained in the air can be filtered by only the cyclone air flows, has been developed.

However, in order to generate a variety of cyclone airflows, a relatively large space must be defined in the multi-cyclone type dust collection unit. In this case, an overall size of the dust collection unit increases, thereby undesirably increasing an overall volume of the vacuum cleaner unit. Therefore, there is a need for an internal structure of the dust collection unit, which can allow the variety of cyclone airflows to be generated while making the dust collection unit compact.

SUMMARY OF THE INVENTION

Accordingly, the present invention is directed to a dust collection unit for a vacuum cleaner that substantially obviates one or more problems due to limitations and disadvantages of the related art.

An object of the present invention is to provide a dust collection unit for a vacuum cleaner, which is designed to be compact while generating a plurality of cyclone airflow therein.

Another object of the present invention is to provide a dust collection unit for a vacuum cleaner, which can provide a relatively large foreign object collection space while improving the dust collection efficiency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a dust collection unit for a vacuum cleaner, including: a first cylindrical filtering chamber for filtering foreign objects contained in air using a cyclone airflow; a plurality of second filtering chamber formed along an outer circumference of the first cylindrical filtering chamber to receive the air passed through the first cylindrical filtering chamber; a first storing chamber formed under the first filtering chamber to store the foreign objects filtered in the first filtering chamber; a second storing chamber for storing the foreign objects filtered in the second filtering chambers; and a connection plate interconnecting opposite ends of the second storing chamber to define the first filtering chamber, the connection plate having a lower end located to be higher than a lower end of the second storing chamber.

In another aspect of the present invention, there is provided a dust collection unit for a vacuum cleaner, including: a first filtering chamber generating a first cyclone airflow, the first filtering chamber having a relatively large diameter; a filter disposed in the first filtering chamber, the filter being formed of plastic material; a plurality of second filtering chambers discontinuously formed along an outer circumference of the first filtering chamber to receive air passed through the first filtering chamber; a first storing chamber for storing foreign objects filtered in the first filtering chamber; a second storing chamber for storing the foreign objects filtered in the second filtering chambers, the second storing chamber being formed in an arc-shape; a connection plate interconnecting opposite ends of the second storing chamber to define the first filtering chamber, the connection plate having a lower end located to be higher than a lower end of the second storing chamber; and an exhaust member guiding the air passed through the second filtering chambers in a direction.

In a further another aspect of the present invention, there is provided a dust collection unit for a vacuum cleaner, including: a first filtering chamber generating a first cyclone airflow, the first filtering chamber having a relatively large diameter; a filter disposed in the first filtering chamber, the filter being formed of plastic material; a blocking member selectively coupled to a lower portion of the filter, the blocking member having a diameter that is increased at it goes downward; a plurality of second filtering chambers discontinuously formed along an outer circumference of the first filtering chamber to receive air passed through the first filtering chamber; a first storing chamber for storing foreign objects filtered in the first filtering chamber; a second storing chamber for storing the foreign objects filtered in the second filtering chambers, the second storing chamber being formed in an arc-shape; a connection plate interconnecting opposite ends of the second storing chamber to define the first filtering chamber, the connection plate having a lower end located to be higher than a lower end of the second storing chamber; and an exhaust member guiding the air passed through the second filtering chambers in a direction.

According to the present invention, a variety of cyclone airflows are possibly generated in the inventive dust collection unit, thereby improving the dust removal efficiency and providing the convenience in use to a user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
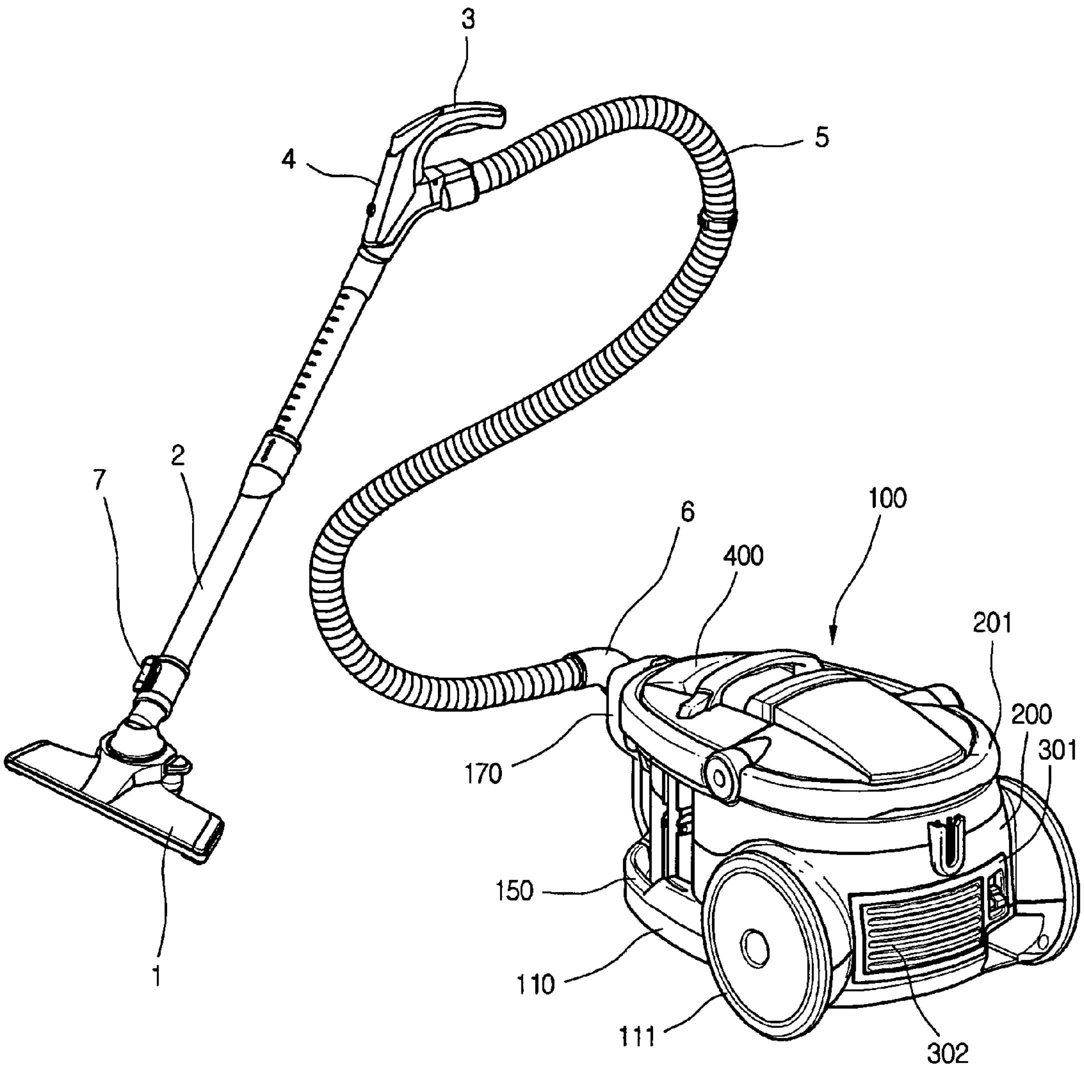
FIG. 1 is a perspective view of a vacuum cleaner where a dust collection unit of the present invention can be employed.

FIG. 1 shows a vacuum cleaner to which a dust collection unit according to the present invention can be applied.

Referring to FIG. 1, a vacuum cleaner includes a main body 100 and a suction assembly connected to a suction portion through which outer air is sucked into the main body 100. Disposed in the main body 100 are a motor (not shown), a suction fan (not shown), and a dust collection unit (not shown). Therefore, the sucked air is exhausted out of the main body 100 after foreign objects contained in the sucked air are filtered.

The suction assembly is provided to suck the air containing the foreign objects when sucking force is generated in the main body 100.

That is, the suction assembly includes a sucking nozzle body 1 for sucking the air containing the foreign objects using a powerful airflow, an expandable tube 2 extending from the sucking nozzle body 1 and expandable and contractible by a user, an operation handle 3 provided on a distal end of the expandable tube 2, a manipulation unit 4 provided on a front portion of the operation handle 3, a flexible tube 5 extending from the operation handle 2, a connector 6 connecting a distal end of the flexible tube 5 to the main body 100, a pipe rest 7 on which the expandable pipe 2 can be supported and suspended when the vacuum cleaner is not used.

The connector 6 functions as a connection terminal transmitting a manipulation signal inputted by the user through the manipulation unit 4 to the main body 100 as well as a passage through which the sucked air is introduced into the main body 100. That is, a plurality of electric connection terminals are provided on a proximal end of the connector 6. However, the electric connection terminals are required only when the manipulation unit 4 is provided on the suction assembly. That is, when the manipulation unit 4 is provided on the main body 100, the electric connection terminals are not provided on the connector 6. In this case, the connector 6 may simply function as an air introducing passage.

The air introduced into the main body 100 through the suction assembly is exhausted out of the main body 100 after the foreign objects contained in the introduced air are filtered. The main body 100 of the vacuum cleaner will be described in more detail hereinafter with reference to FIGS. 1 and 2.

Figure 2:
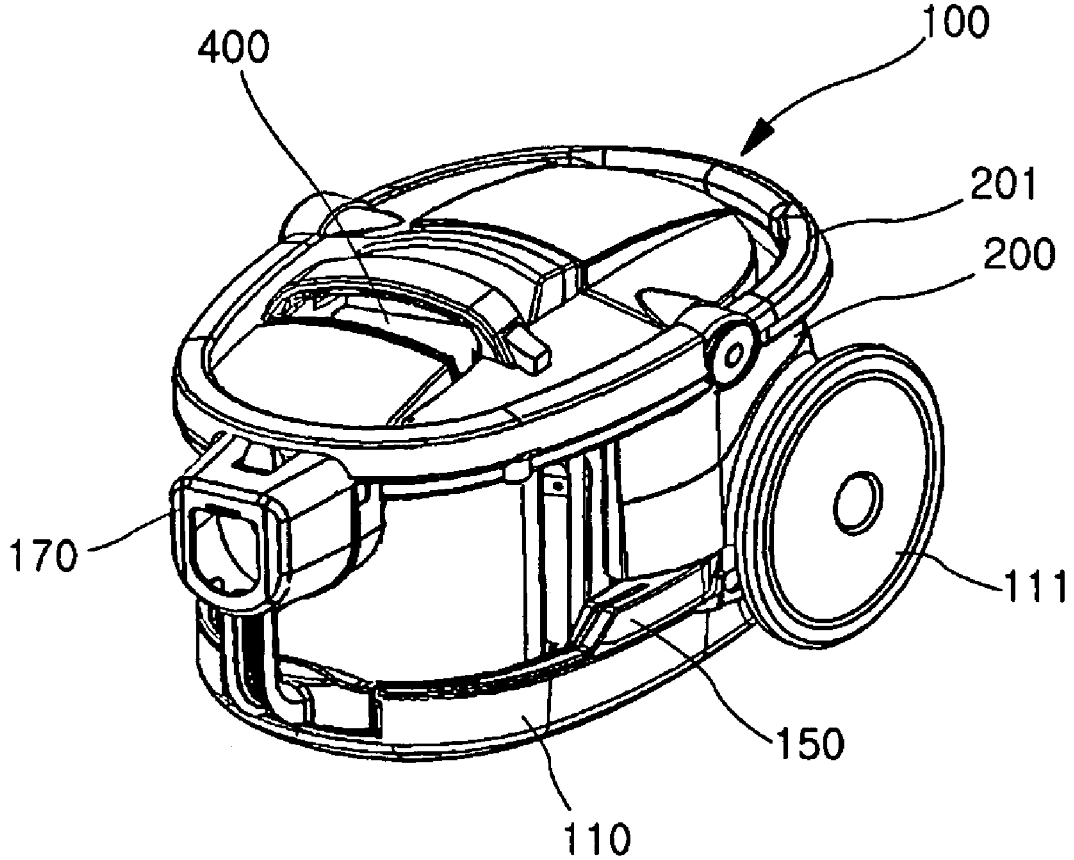
FIG. 2 is a front perspective of a vacuum cleaner depicted in FIG. 1.

FIG. 2 shows the main body of the vacuum cleaner.

Referring to FIGS. 1 and 2, the main body 100 includes a first base 110 defining a lower portion of the main body 100, a second base 150 disposed on the first base 110, a cover 200 disposed on the second base 150, wheels 111 provided on both rear-side portions of the cover 200 to make it easy to move the main body 100, and a front support 170 for supportedly fixing the cover 200 and the first and second bases 110 and 150.

The connector 6 is connected to the front support 170 to allow the outer air to be introduced into the main body 100. The support 170 is designed to support the cover 200 and the first and second bases 110 and 150, thereby securely supporting the front portion of the main body 100.

The second base 150 is provided right above the first base 110 to improve the ornament of the main body and enhance the rigidity of the lower portion of the main body.

An exhaust cover 301 provided with a plurality of exhaust holes 302 is provided on a rear portion of the cover 200 to exhaust clean air. A carrying handle 201 is pivotally provided on a top surface of the cover 200. When a user intends to carry the main body 100, the user pivots the carrying handle 201 in a vertical position and conveniently carries the main body 100 with his/her hand grasping the carrying handle 201.

A dust collection unit 400 is disposed in the main body in rear of the front support 170 and a cyclone member (not shown) is received in the dust collection unit to generate cyclone airflows and filter the foreign object contained in the air.

Figure 3:
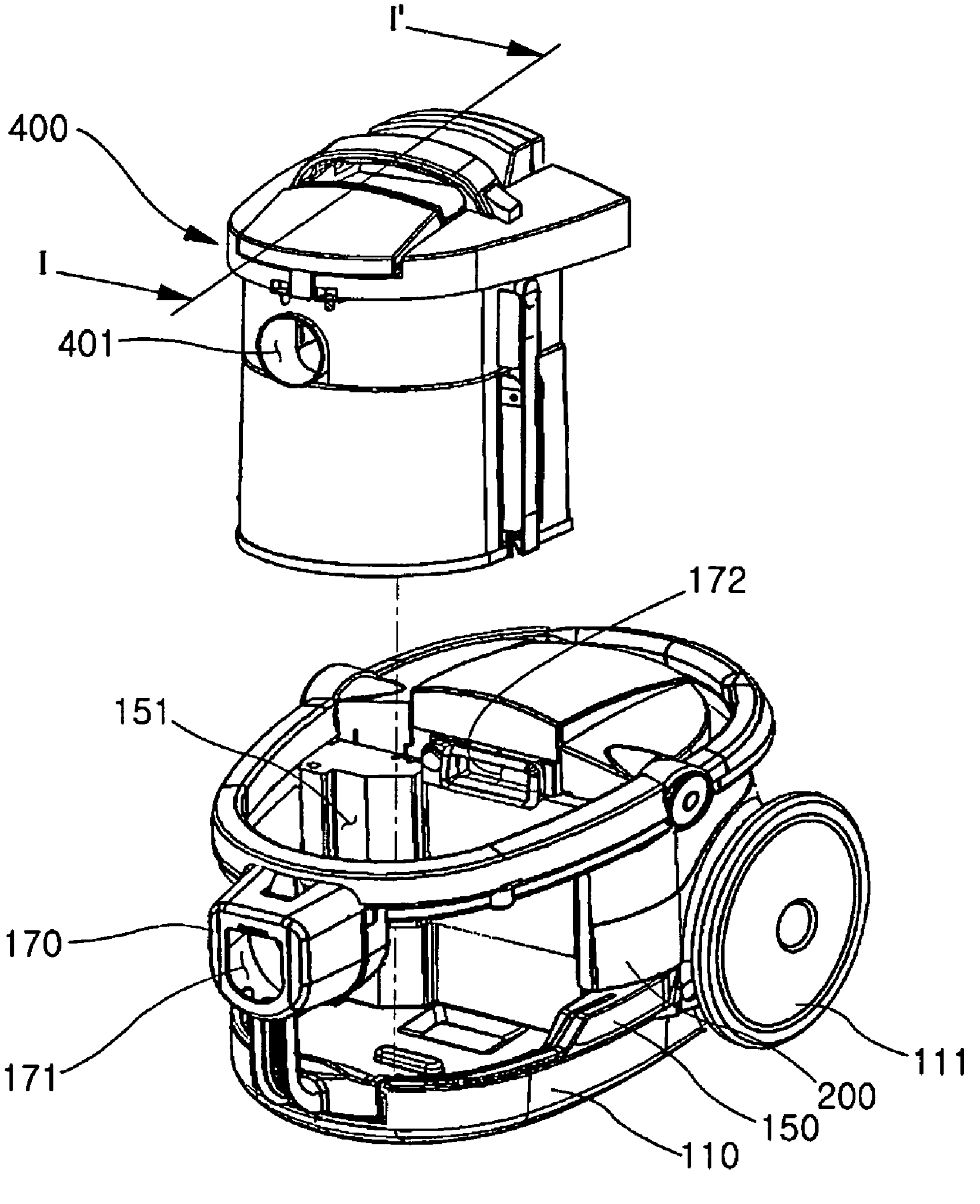
FIG. 3 is a perspective view illustrating a vacuum cleaner and a dust collection unit according to an embodiment of the present invention, which is separated from the vacuum cleaner.

As shown in FIG. 3, the dust collection unit 400 is vertically installed in and separated from a receiving chamber 151 defined in the main body 100. That is, the dust collection unit 400 may be installed in the receiving chamber 151 by being pushed downward and separated from the receiving chamber 151 by being pulled upward.

The front support 170 is provided with a first air intake hole 171 and the dust collection unit 400 is provided with a second air intake hole 401 corresponding to the first air intake hole 171. The dust collection unit 400 is further provided with an exhaust hole (not shown) opposite to the second air intake hole 401. The exhaust hole is aligned with a third air intake hole 172 formed toward the motor so that the air cleaned by passing through the collection unit 400 is exhausted toward the motor side.

Particularly, the third air intake hole 172 is formed in a rectangular shape lengthwise in a horizontal direction so as to reduce the size of the main body 100 and allow the air to effectively flow.

Figure 4:
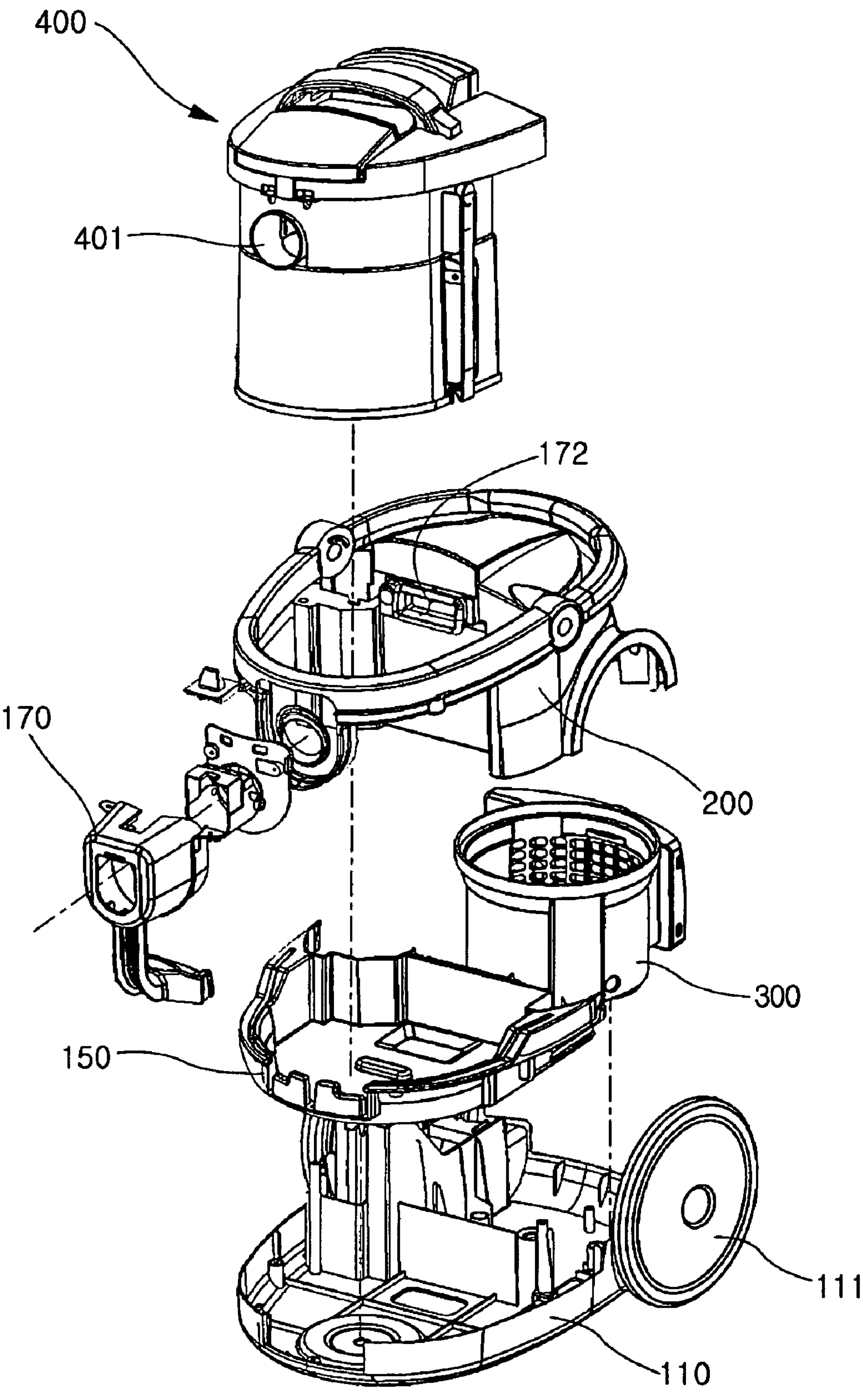
FIG. 4 is an exploded perspective view of a main body of a vacuum cleaner where a dust collection unit according to an embodiment of the present invention is employed.

FIG. 4 shows the main body of the vacuum cleaner.

Referring to FIG. 4, the second base 150 is disposed on a rear-top portion of the first base 110. A motor housing 300 is disposed on a rear portion of the first base 110. Then, the cover 200 is coupled to the first and second bases 110 and 150 to define the main body 100.

Here, the cover 200 is coupled to the first and second bases 110 and 150 in a state where the front support 170 is coupled to the cover 200. A flowing direction of the air introduced into the motor housing 300 through the third air intake hole 172 is changed by 90° in a vertical direction and is then changed in a horizontal direction so that the air can be exhausted rearward.

Figure 5:
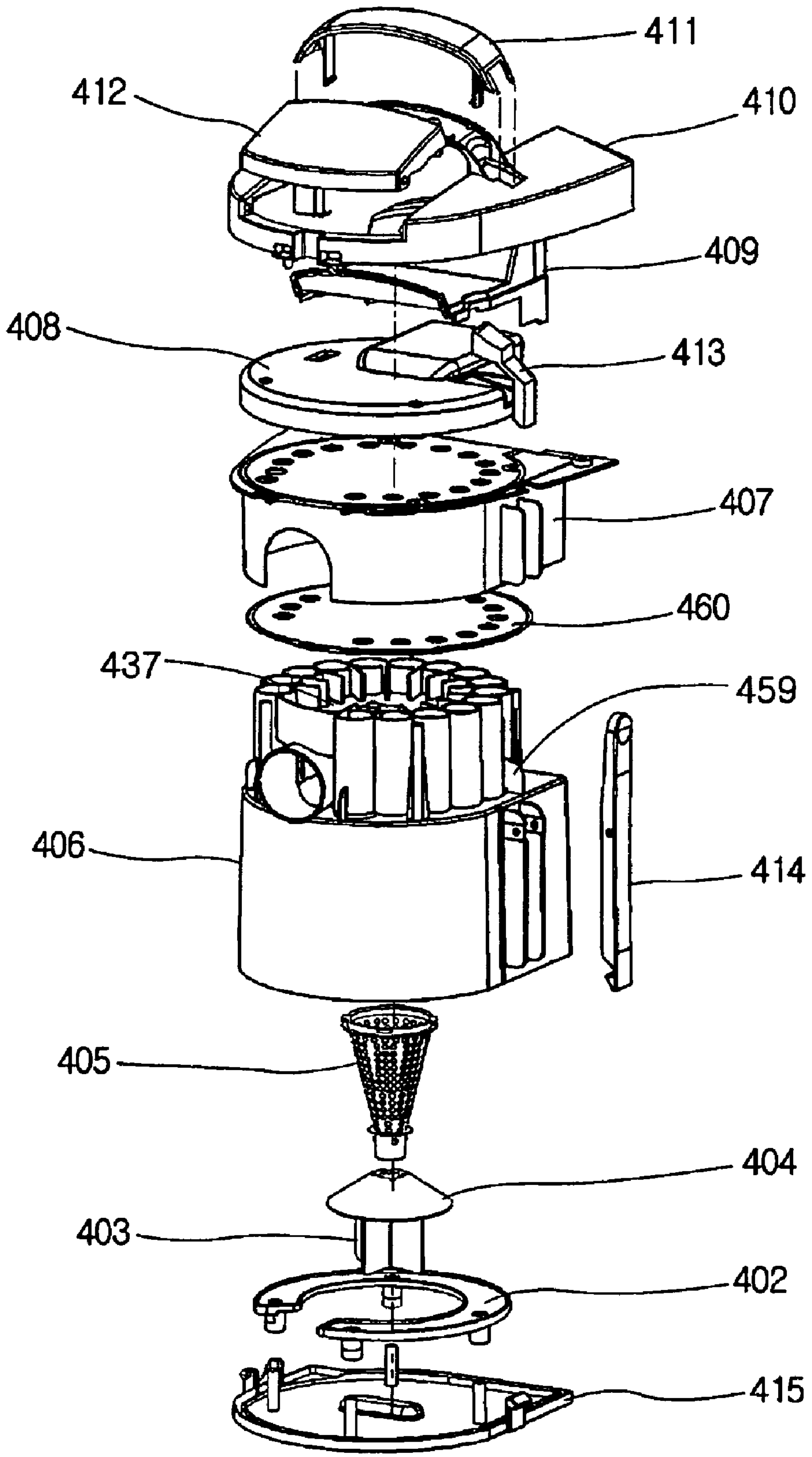
FIG. 5 is an exploded perspective view of a dust collection unit depicted in FIG. 4.

FIG. 5 shows the dust collection unit according to an embodiment of the present invention.

Referring to FIG. 5, the inventive dust collection unit 400 does not use a porous filter such as a sponge. That is, the inventive dust collection unit 400 is designed to filter the foreign objects using cyclone airflows. The cyclone airflow is generated at least two chambers separated from each other so that even the micro-scale dusts contained in the air can be filtered. This will be described in more detail hereinafter.

The dust collection unit 400 includes a collection body 406 provided with a plurality of filtering chambers (refer to the reference numerals 423 and 424 of FIG. 7) for filtering the foreign objects and a plurality of storing chambers (refer to the reference numerals 417 and 416 of FIG. 7) for storing the filtered foreign objects, chamber sealing members 402 and 415 provided to seal a bottom of the collection body 406 and prevent the foreign objects stored in the storing chambers 416 and 417 from leaking, an air exhaust member 407 disposed on the collection body 406 to guide the flow of the air exhausted from the collection body 406, a gap forming member 408 providing a predetermined gap above the exhaust member 407 to allow the air exhausted from the exhaust member 407 to flow in a direction, and a cover assembly disposed on the gap forming member 408.

The cover assembly includes a first cover 410 functioning as a main body of the cover assembly, second and third covers 409 and 412 respectively disposed in rear and front of the first cover 410, a cover fixing member 411 fixing the first and second covers 410 and 409. The cover fixing member 411 is designed to cover a portion of the first cover 410 to improve the outer appearance while simultaneously fixing the first and second covers 410 and 409.

Disposed in the dust collection body 406 are a cone-shaped filter 405 and a blocking member 404 and airflow preventing plates 403. The cone-shaped filter 405 is provided to effectively filter the foreign objects when the cyclone airflows are generated. The blocking member 404 is disposed under the cone-shaped filter 405 to prevent the collected foreign objects from flying. The airflow preventing plates 403 are formed under the blocking member 404 to lower the airflow rate and to thereby allow the foreign objects to sink to the bottoms of the foreign object storing chambers.

The airflow preventing plates 403 and the blocking member 404 may be integrally formed with each other while the cone-shaped filter 405 may be provided as a separated part.

In addition, an opening/closing button 413 is provided on the first cover 410 and an opening/closing lever 414 having a first end contacting the opening/closing button 413 to pivot when the opening/closing button 413 is pushed. The opening/closing lever 414 has a second end contacting the first chamber sealing member 415. Therefore, when the opening/closing lever 414 is pushed, the opening/closing lever 414 pivots around a predetermined hinge point. When the second end of the opening/closing lever 414 moves away from the first chamber sealing member 415, the first chamber sealing member 415 rotates around a hinge point by its self-gravity and the foreign objects collected in the storing chambers 416 and 417 settled by their self-gravities.

In addition, the chamber sealing members 415 and 402 are designed to respectively seal the bottoms of the foreign object storing chambers 416 and 417. The first chamber sealing member 415 is hinge-coupled to the collection body 406 so that it can be opened by a pivotal motion when it is intended to throw away the foreign objects stored in the first chamber sealing member 415. A separation plate 437 for separating the first and second filtering chambers 423 and 424 from each other and defining an air passage is provided on a top surface of the collection body 406.

A plurality of guide ribs 459 are formed on an outer circumference of the collection body 406 to guide the insertion of the exhaust member 407 around the collection body 406. Each of the guide ribs 459 are gently rounded at an upper corner to effectively guide the insertion.

The first and second filtering chambers 423 and 424 separated from each other are formed in the collection unit 400 to filter the foreign objects using the cyclone airflows. Volumes of the first and second filtering chambers are different from each other. The first filtering chamber 423 is provided to generate the cyclone airflow by rotating the air introduced through the second air intake hole 401 of the collection unit 400. The second filtering chambers 424 are provided in plurality to filter the foreign objects still contained in the air and introduced via the first filtering chamber 423 by generating the cyclone airflow. The second filtering chambers 424 are provided along the outer circumference first filtering chamber 423.

The first and second filtering chambers 423 and 424 will be described in more detail hereinafter.

Figure 6:
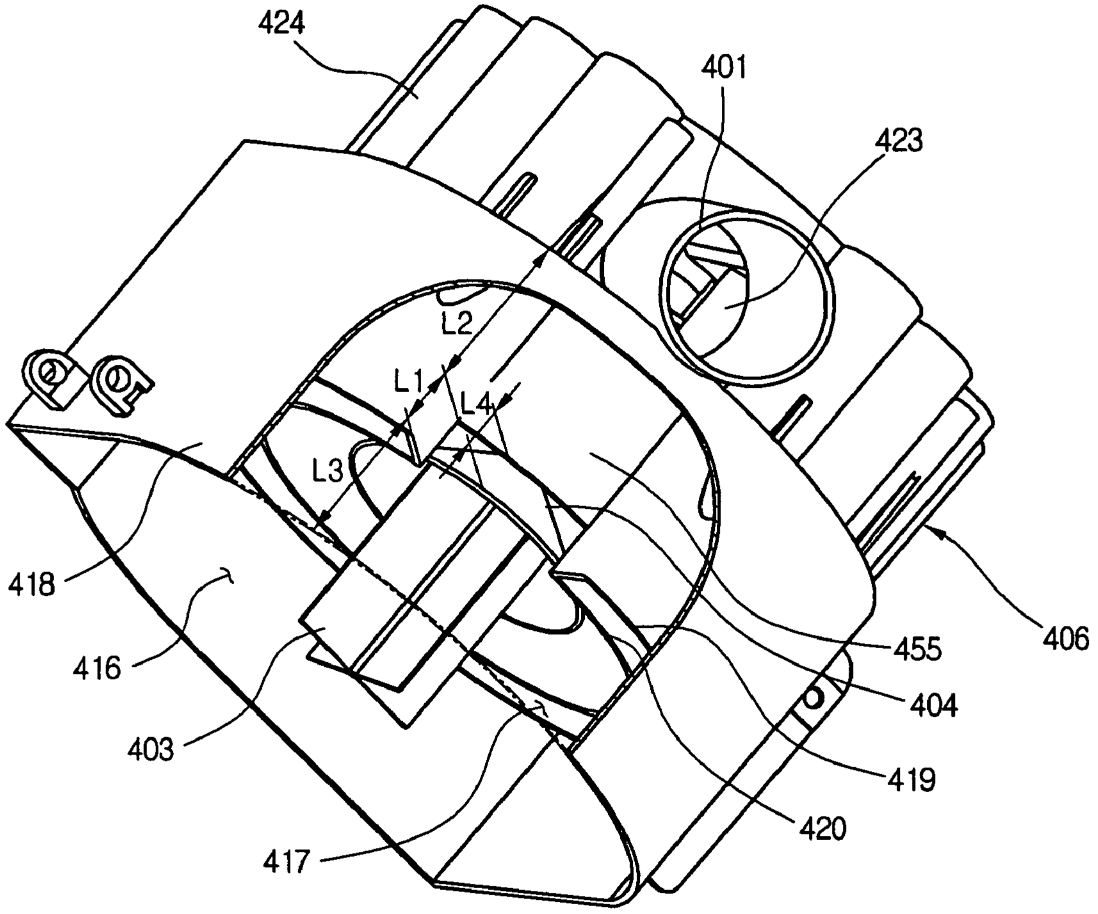
FIG. 6 is a partially broken perspective view of a dust collection body of a dust collection unit according to one embodiment of the present invention.
Figure 7:
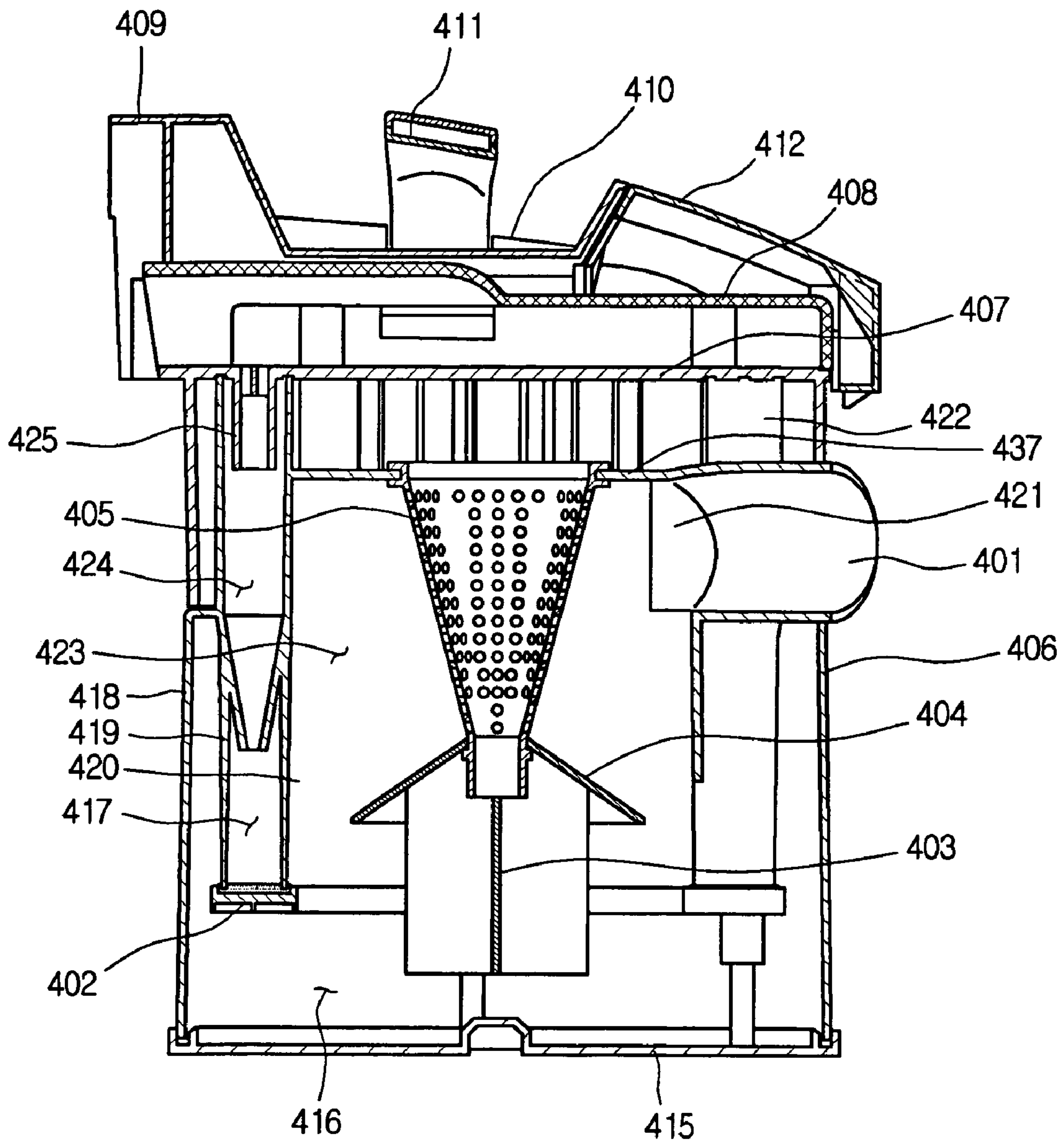
FIG. 7 is a sectional view taken along lines I-I' of FIG. 3.

FIGS. 6 and 7 show the collection body in detail.

As shown in the drawings, the collection body is provided with the first filtering chamber 423 for filtering the foreign object contained in the air introduced through the second air intake hole 401 of the dust collection unit by generating the cyclone airflow and the second filtering chambers 424 for further filtering the foreign objects contained in the air introduced via the first filtering chamber 423 by further generating the cyclone airflows. The introduced air, relatively large-sized foreign object of which is filtered in the first filtering chamber 423 flows upward to be introduced into the second filtering chamber 424.

The second storing chamber 417 is provided to communicate with lower ends of the second filtering chambers 424 to store the foreign objects filtered by the second filtering chambers 424. The first storing chamber 416 divided by the cone-shaped filter 405 and the blocking member 404 is provided under the first filtering chamber 423 to store the foreign objects filtered by the first filtering chamber 423.

The second storing chamber 417 is defined between an intermediate wall 419 and an inner wall 420 while the first storing chamber 416 is defined under the blocking member 404 between the intermediate wall 419 and an outer wall 418.

The second filtering chambers 424 are formed along the outer circumference of the first filtering chamber 423. However, since the second air intake hole 401 is formed on a portion of the outer circumference of the first filtering chamber 423, the second filtering chambers 424 are not formed on the portion where the second air intake hole 401 is formed. The second filtering chambers 424 are formed in a semi-circular cylinder shape. Therefore, the second storing chamber 417 is not formed on the portion where the second air intake hole 401 is formed in response to the shape of the second filtering chambers 424. A portion where the second storing chamber 417 is not formed becomes the second air intake hole 401. Opposite circumferential ends of the second storing chamber 417 are interconnected by a connection plate 455.

The second storing chamber 402 may be formed in a circular shape or other shapes according to the location of the air intake hole 401. When the second storing chamber 402 is formed in the circular shape, the connection plate 455 may not be provided. However, since the second air intake hole 401 is at least partly opened to provide an air intake passage, it is preferable that the connection plate 455 is provided.

Describing in more detail, the connection plate 455 is formed extending from the inner wall 420 to enhance the generation of the cyclone airflow in the first filtering chamber 423 defined by an inner space of the inner wall 420. The cyclone airflow is dispersed at an opened lower space of the connection plate 455. Therefore, the cyclone airflow generated in the first filtering chamber 423 prevents the foreign objects from contacting the first storing chamber 416, and thereby preventing the foreign objects stored in the first storing chamber from being suspended.

To accomplish this, the connection plate 455 is formed up to a predetermined depth from a lower end of the second air intake hole 423. That is, a lower end of the connection plate 455 is designed to not reach a lower end of the second storing chamber 417.

Describing in more detail, the connection plate is designed to have a height L2 less than that (L1+L2) of the inner wall 420. Therefore, the height L2 of the connection plate is less than that of the second storing chamber 402. A height from a lower end of the inner wall 420 to a bottom of the collection unit 400 becomes a height of a storing space where the foreign objects filtered by the first filtering chamber 423 is stored.

Preferably, the lower end of the connection plate 455 is located at a portion higher than a lower end of the blocking member 404. Therefore, a predetermined gap L4 is defined between the lower end of the connection plate 455 and the lower end of the blocking member 404. In addition, when a length of the blocking member 404 is increased, it is preferable that a length of the connection plate 455 is proportionally increased.

By the above-described structure, the foreign objects filtered in the first filtering chamber 423 and directed toward the blocking member 404 can be effectively exhausted to a space between the outer wall 418 and the intermediate wall 419 through the lower opened space of the connection plate 455. The foreign objects stored in the first storing chamber 416 is not redirected into the first filtering chamber 423 by the blocking member 404. Since the foreign objects can be effectively directed into the first storing chamber 416 through the lower opened space of the connection plate 455, the height of the first storing chamber 416 is heightened by a height L1. Therefore, an overall height of the first storing chamber 416 becomes L1+L3, thereby increasing the overall volume of the first storing chamber 416.

It may be surmised, when the overall volume of the first storing chamber 416 is reduced by eliminating the lower opened space of the connection plate 455, the height L3 should be proportionally increased and the overall size of the dust collection unit should be also proportionally increased.

The height L2 of the connection plate 455 is set not to undesirably affect on the generation of the cyclone airflow in the first filtering chamber 423.

As described above, by forming the connection plate having a predetermined height, the internal structure of the dust collection unit becomes more compact, not affecting on the dust collection efficiency and increasing the volume of the storing chamber.

The internal structure and operation of the dust collection unit 400 will be described in more detail with reference to FIG. 7.

As described with reference to FIG. 5, the dust collection unit 400 includes the collection body 406, the chamber sealing members 402 and 415 provided to selectively seal the bottom of the collection body 406, the cone-shape filter 405 received in the collection body 406 to enhance the dust collection efficiency, the blocking member 404 preventing the foreign objects stored in the collection body 406 from flying, the airflow preventing plates 403 for lowering the airflow rate and for thereby allowing the foreign objects to sink to the bottoms of the foreign object storing chambers, the air exhaust member 407 disposed on the collection body 406 to guide the flow of the air exhausted from the collection body 406, the gap forming member 408 providing a predetermined gap above the exhaust member 407 to allow the air exhausted from the exhaust member 407 to flow in a direction, and covers 409, 410, 411, and 412 disposed on the gap forming member 408.

The collection body 406 includes the outer wall 418, the intermediate wall 419 and the inner wall 420. The outer wall 418 and the intermediate wall 419 are not formed on the portion where the second air intake hole 401 is formed, thereby allowing the air to be effectively introduced.

A space defined between the outer wall 418 and the intermediate wall 419 becomes the first storing chamber 416 and a space defined between the intermediate wall 419 and the inner wall 420 becomes the second storing chamber 417. An inner space defined by the inner wall 420 becomes the first filtering chamber 423. However, the functions of the spaces vary according to the shape of the dust correction unit 400.

The operation of the above-described dust collection unit will be described hereinafter with reference to the airflow.

The air is first introduced into the dust collection unit 400 through the second air intake hole 401. Here, an outer end of the second air intake hole 401 communicates with the front support 170 and an inner end of the second air intake hole 401 communicates with the first filtering chamber 423. A first air introduction guide 421 is projected inward from a portion of the inner wall 420, which defines the inner end of the second air intake hole 401, to guide the air in an inner circumferential direction of the first filtering chamber 423.

When the cyclone airflow is generated in the first filtering chamber 423, the foreign objects contained in the air are settled and the cleaned air is exhausted upward through pores of the cone-shaped filter 405. The second air exhaust hole 401 is formed corresponding to an upper portion of the cone-shaped filter 405, a relatively high RPM cyclone airflow is generated at the upper portion of the cone-shaped filter 405 and a relatively low RPM cyclone airflow is generated at a lower portion of the cone-shaped filter 405. This is the reason for forming the filter 405 in the cone-shape. That is, since a large amount of the foreign objects are forced outward in the relatively high RPM cyclone airflow and a large amount of the foreign objects are forced in the relatively low RPM cyclone airflow, it is preferable that the filter 405 is formed in the cone-shape.

The cone-shaped filter 405 may be detachably seated on a center of the separation plate 437 defining a top wall of the first filtering chamber 423. The cone-shaped filter 405 is typically provided with a plurality of pores through which the air passes.

The blocking member 404 is disposed under the cone-shaped filter 405 to prevent the settled foreign objects from flying. The blocking member 404 has a diameter that is increased as it goes downward to prevent the foreign objects from flying in a reverse direction.

The airflow preventing plates are disposed under the blocking member 404 at a predetermined gap to prevent the cyclone airflow form reaching the settled foreign objects, thereby basically preventing the settled foreign objects from flying.

The foreign objects filtered in the first filtering chamber 423 are stored in the first storing chamber 416 formed under the first filtering chamber 423. A bottom of the first storing chamber 416 is sealed by the first sealing member 415. The air introduced passes through the first filtering chamber 423, in the course of which the relatively large-sized foreign objects contained therein are filtered, and is then directed to the separation plate 437 through the cone-shaped filter 405. Therefore, in order to filter micro-scale foreign objects, additional cyclone airflow is further required. This will be described in more detail hereinafter.

The air passing through the cone-shaped filter 405 is introduced into the second filtering chambers 424 through a second air introduction guide 422. Since the second air introduction guide 422 faces the inner circumference of the second filtering chambers 424 in a tangent direction, the cyclone airflow is generated in the second filtering chamber 424.

The foreign objects filtered in the second filtering chambers 424 by the cyclone airflow are settled in the second storing chamber 417. In order to prevent the settle foreign objects from flying, a width of each of the lower portion of the second filtering chambers 417 are narrowed. In addition, in order to prevent the settled foreign objects from leaking, a bottom of the second storing chamber 417 is sealed by the second chamber sealing member 402.

The second chamber sealing member 402 has a bar-shaped connection structure to be connected to the first chamber sealing member 415, thereby increasing an inner volume of the first storing chamber 416. That is, since the foreign objects are stored in the space defined between the lower end of the second chamber sealing member 402 and the upper end of the first chamber sealing member 415, it is preferable that the connection structure is formed in a bar-shape that can occupy a small space.

The air whose foreign objects are filtered in the second filtering chamber 424 is introduced into the exhaust member 407 via an exhaust side air intake hole 425 and collected in a space between the exhaust member 407 and the gap forming member 408. Here, a diameter of the exhaust side air intake hole 425 is less than an inner diameter of the second filtering chamber 424 so as to prevent the foreign objects in the second filtering chamber 424 from being directed to the exhaust member 407. That is, the foreign objects collected on the inner circumference of the second filtering chambers 424 are not exhausted through the exhaust side air intake hole 425.

The air whose foreign objects are filtered in the first and second filtering chambers 423 and 424 by the cyclone airflows is directed to the motor and then exhausted through the rear surface of the main body 100.

Meanwhile, the cover assembly is further formed on an upper portion of the gap forming member 408. The cover assembly includes the first cover 410, the second and third covers 409 and 412 covering the rear and front portions of the first cover 410, and the cover fixing member 411 fixing the second cover 409 to the first cover 410.

The operation of the above-described dust collection unit 400 and the overall operation of the main body 100 of the vacuum cleaner will be described hereinafter with reference to FIG. 8.

Figure 8:
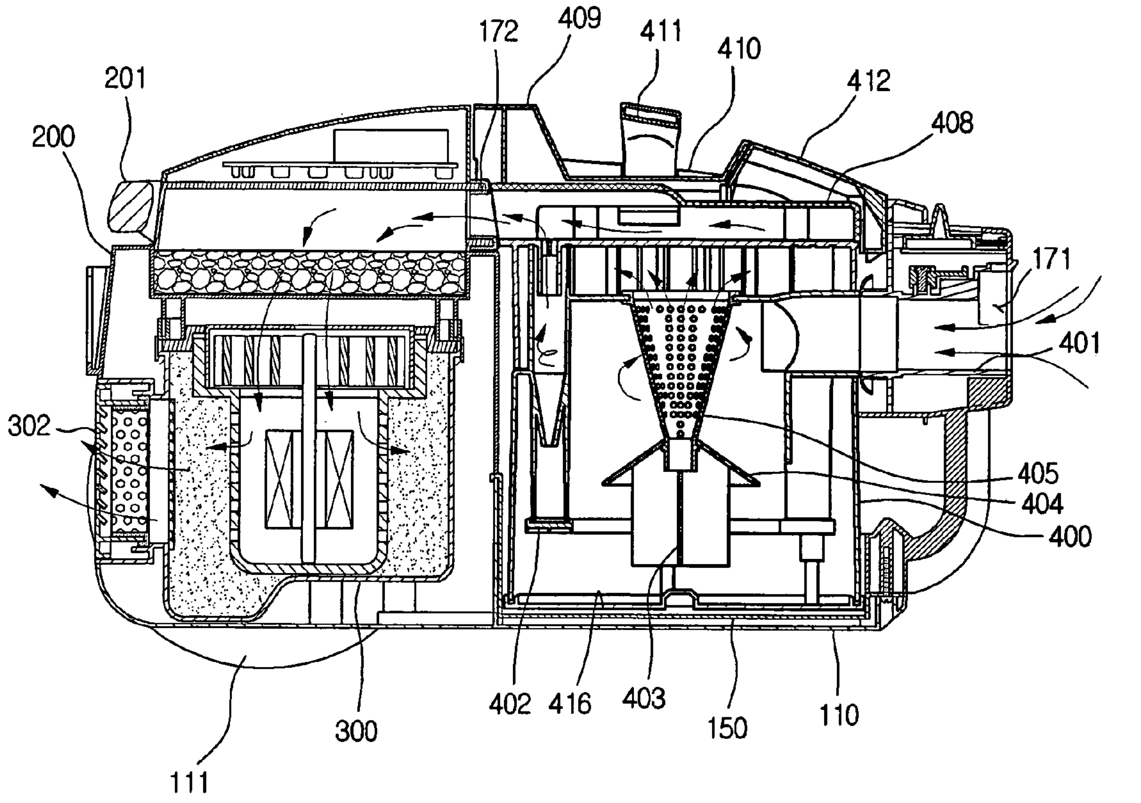
FIG. 8 is a sectional view of a vacuum cleaner where a dust collection unit according to an embodiment of the present invention is provided.

Referring to FIG. 8, outer air is introduced into the main body 100 through the air intake hole 171 of the main body 100 and is then introduced into the dust collection unit 400 through the air intake hole of the dust collection unit. The foreign objects contained in the air is filtered in the dust collection unit 400 as described above and is then introduced into the motor housing 300 in a horizontal direction.

The air introduced into the moor housing 300 in the horizontal direction moves downward to be exhausted through the exhaust holes 302 formed on the rear surface of the main body 100.

It will be apparent to those skilled in the art that various modifications and variations can be made in the present invention. Thus, it is intended that the present invention covers the modifications and variations of this invention provided they come within the scope of the appended claims and their equivalents.

According to the present invention, the internal structure of the dust collection unit may be designed to be more compact while increasing the dust collection efficiency as well as the foreign object storing volume in the dust collection unit.

What is claimed is:

1. A dust collection unit for a vacuum cleaner, comprising:

a first cylindrical filtering chamber for filtering foreign objects contained in air using a cyclone airflow;

a plurality of second filtering chambers formed along an outer circumference of the first cylindrical filtering chamber to receive the air passed through the first cylindrical filtering chamber;

a first storing chamber formed under the first filtering chamber to store the foreign objects filtered in the first filtering chamber;

a second storing chamber for storing the foreign objects filtered in the second filtering chambers; and a connection plate interconnecting opposite ends of the second storing chamber to define the first filtering chamber, wherein at least a portion of a vertical length of the connection plate overlaps at least a portion of a vertical length of the second storing chamber, and a lower end of the connection plate is offset from a lower end of the second storing chamber creating a lateral opening through which foreign objects pass.

2. The dust collection unit according to claim 1, wherein the connection plate extends from an upper end of the first filtering chamber to a lower end of the first filtering chamber.

3. The dust collection unit according to claim 1, wherein the lower end of the connection plate is located to be lower than a lower end of a filter disposed in the first filtering chamber.

4. The dust collection unit according to claim 1, wherein the first storing chamber further extends downward of the second storing chamber.

5. The dust collection unit according to claim 1, wherein the foreign objects filtered in the first filtering chamber are exhausted through the opening disposed at a lower opened end of the connection plate.

6. The dust collection unit according to claim 1, wherein the connection plate interconnects ends of an inner wall of the second storing chamber.

7. The dust collection unit according to claim 1, further comprising:

a filter having a top surface coupled to a top of the first filtering chamber;

a blocking member disposed under the filter to prevent the foreign objects from flowing in a reverse direction; and an airflow preventing plate extending downward from the blocking member.

8. The dust collection unit according to claim 7, wherein a lower end of the connection plate is located to be higher than a lower end of the blocking member.

9. The dust collection unit according to claim 7, wherein a lower end of the blocking member is located to be higher than a lower end of the second storing chamber.

10. The dust collection unit according to claim 1, wherein the first storing chamber is defined on an outer space of the second storing chamber.

11. The dust collection unit according to claim 1, wherein the outer air is introduced through an upper portion of the first filtering chamber.

12. The dust collection unit according to claim 1, wherein the connection plate has an arc-shaped section.

13. A dust collection unit for a vacuum cleaner, comprising:

a first filtering chamber generating a first cyclone airflow, the first filtering chamber having a relatively large diameter;

a filter disposed in the first filtering chamber, the filter being formed of plastic material;

a plurality of second filtering chambers discontinuously formed along an outer circumference of the first filtering chamber to receive air passed through the first filtering chamber;

a first storing chamber for storing foreign objects filtered in the first filtering chamber;

a second storing chamber for storing the foreign objects filtered in the second filtering chambers, the second storing chamber being formed in an arc-shape;

a connection plate interconnecting opposite ends of the second storing chamber to define the first filtering chamber, wherein at least a portion of a vertical length of the connection plate overlaps at least a portion of a vertical length of the second storing chamber, and a lower end of the connection plate is offset from a lower end of the second storing chamber creating a lateral opening through which foreign objects pass; and an exhaust member guiding the air passed through the second filtering chambers in a direction.

14. The dust collection unit according to claim 13, wherein an air intake hole is formed on a portion of the outer circumference of the first filtering chamber, on which the second filtering chamber is not formed.

15. The dust collection unit according to claim 14, wherein the air intake hole is formed on an upper portion of the first filtering chamber.

16. The dust collection unit according to claim 13, wherein the filter is fixed on a top of the first filtering chamber to be detachable downward.

17. The dust collection unit according to claim 13, wherein foreign objects are exhausted through a lower portion of the connection plate.

18. A dust collection unit for a vacuum cleaner, comprising:

a first filtering chamber generating a first cyclone airflow, the first filtering chamber having a relatively large diameter;

a filter disposed in the first filtering chamber, the filter being formed of plastic material;

a blocking member selectively coupled to a lower portion of the filter, the blocking member having a diameter that is increased at it goes downward;

a plurality of second filtering chambers discontinuously formed along an outer circumference of the first filtering chamber to receive air passed through the first filtering chamber;

a first storing chamber for storing foreign objects filtered in the first filtering chamber;

a second storing chamber for storing the foreign objects filtered in the second filtering chambers, the second storing chamber being formed in an arc-shape;

a connection plate interconnecting opposite ends of the second storing chamber to define the first filtering chamber, wherein at least a portion of a vertical length of the connection plate overlaps at least a portion of a vertical length of the second storing chamber, and a lower end of the connection plate is offset from a lower end of the second storing chamber creating a lateral opening through which foreign objects pass; and an exhaust member guiding the air passed through the second filtering chambers in a direction.

19. The dust collection unit according to claim 18, wherein the lower end of the connection plate is located to be higher than a lower end of the blocking member.

* * * * *